(12) United States Patent
Yokoyama

(10) Patent No.: US 8,309,149 B2
(45) Date of Patent: Nov. 13, 2012

(54) PACKING METHOD AND CORRESPONDING COVERS FOR HYDROGEN-REDUCED WATER OR FOOD PRODUCTION

(76) Inventor: Isao Yokoyama, Yokohama (JP)

( * ) Notice: Subject to any disclaimer, the term of this patent is extended or adjusted under 35 U.S.C. 154(b) by 692 days.

(21) Appl. No.: 12/219,668

(22) Filed: Jul. 25, 2008

(65) Prior Publication Data

US 2009/0090087 A1 Apr. 9, 2009

(30) Foreign Application Priority Data

Jul. 27, 2007 (JP) ................................. 2007-195460

(51) Int. Cl.
*B65B 25/06* (2006.01)
*B65B 31/02* (2006.01)
*B67B 1/00* (2006.01)

(52) U.S. Cl. ............. 426/397; 426/67; 426/313; 53/432; 53/471

(58) Field of Classification Search .................. 426/392, 426/395, 397, 398, 404, 313, 67; 53/79, 53/86, 109, 432, 471; 220/200

See application file for complete search history.

(56) References Cited

U.S. PATENT DOCUMENTS

| | | | |
|---|---|---|---|
| 4,287,995 A * | 9/1981 | Moriya | 215/228 |
| 6,221,416 B1 * | 4/2001 | Nohren, Jr. | 426/394 |
| 2005/0224996 A1 | 10/2005 | Yoshida | |
| 2006/0083788 A1 * | 4/2006 | Usui | 424/600 |
| 2007/0148256 A1 | 6/2007 | Yanagihara et al. | |
| 2009/0199574 A1 * | 8/2009 | Hirose et al. | 62/46.1 |

FOREIGN PATENT DOCUMENTS

| | | |
|---|---|---|
| GB | 2255555 A | 11/1992 |
| JP | 2002-301483 A | 10/2002 |
| JP | 3606466 B1 | 1/2005 |
| JP | 2005-344227 * | 12/2005 |
| KR | 20050018776 A | 2/2005 |

OTHER PUBLICATIONS

Derwent Abstract 2006-041821.*

* cited by examiner

*Primary Examiner* — Drew Becker
*Assistant Examiner* — Luana Z Long
(74) *Attorney, Agent, or Firm* — Laubscher & Laubscher, P.C.

(57) ABSTRACT

A capping method and its cap for hydrogen-reduced water or hydrogen-reduced food production are characterized by fine carbon particles absorbing hydrogen being attached to the cap. After filling and capping the container, the hydrogen will be dissolved into the food. In addition, the fine carbon particles, flavorings, processed and unprocessed food are attached to the cap, and during the heating and sterilizing process, the extraction or cooking can be finished, omitting conventional extraction and heating steps when cooking. This result can be used in all food production fields.

11 Claims, 15 Drawing Sheets

| Manufacturing Method of extracted beverage |

| Water & raw stuff of extracted beverage |

| Extracted (heating) |

| Storage tank (flavoring) |

| Filling |

| Capping (sealing) |

| Sterilizing (heating) |

| Bale packing |

| Manufacturing Method of non-extracted beverage |

| Water & raw stuff of non-extracted beverage |

| Extracted (heating) |

| Storage tank (flavoring & storage) |

| Filling |

| Capping (sealing) |

| Sterilizing (heating) |

| Bale packing |

| Manufacturing Method of canned food |
|---|

| Raw stuff of food |
|---|

| Processing (heating) |
|---|

| Storage tank (storage) |
|---|

| Filling |
|---|

| Capping (sealing) |
|---|

| Sterilizing (heating) |
|---|

| Bale packing |
|---|

PACKING METHOD AND CORRESPONDING COVERS FOR HYDROGEN-REDUCED WATER OR FOOD PRODUCTION

FIELD OF THE INVENTION

This invention relates to a filling and sealing process of an airtight package or container for food and to a sealing cap or cover to hydrogen-reduced food (including water and beverages).

BACKGROUND OF THE INVENTION

Ingested food is burned by the oxygen breathed into the body by the lungs in order to maintain the metabolizing process and maintain life. But, the burning has an oxidation effect and active oxygen generated by the burning may have side effects on the human body. This phenomenon has drawn attention. The active oxygen can play an active role in the body such as for transferring information in cells, killing bacteria in the body via oxidization, etc., but on the other hand, if too much active oxygen is generated in the body, it can harm the body's DNA and become the key factor inducing adulthood diseases and life-style related diseases such as cancer, and the like. The human body generates SOD (super-oxide dismutase) to remove the excessive active oxygen. SOD generation capacity reaches its peak at the age of 20 and then declines year by year and becomes only half of the peak at 40 years of age, thereby increasing the occurrence of adulthood diseases and life-style related diseases with aging. The above diseases are 90% influenced by the active oxygen so it becomes very important to find out how to supplement SOD whose level declines year after year to prevent adulthood diseases. The invention was developed as a result of the functions that the hydrogen and carbon have in this regard.

Hydrogen is the richest element in the universe. On earth it exists in water, organic compounds, and the like as a constituent element. Hydrogen is very light and can burn or explode in the air but does not produce CO2 (carbon dioxide) and has become a surprising clean energy source in this century. The substance's oxidizing ability is numerically represented as ORP (oxidation-reduction potential). The bigger the ORP positive value the stronger the oxidizing power, and the smaller the ORP negative value the stronger the reducing power (producing oxygen gas). Hydrogen has strong reducing ability with its inherent value at −420 mV so if it is delivered into the body, it can reduce and neutralize active oxygen into water to render the active oxygen harmless. In recent years, the reducing ability of the hydrogen element has drawn attention and the healthcare hydrogen-reduced water and its apparatus for preparation have been developed by dissolving the hydrogen gas into water as disclosed in U.S. Pat. No. 3,606,466. Because hydrogen gas is difficult to dissolve in water, and the hydrogen-reduced water will contact the air in very short sealing time after it is filled into a package, and because the residual air in the upper portion of a package or container can also oxidize the sealed hydrogen-reduced water over time, all these will weaken the reducing ability of the hydrogen gas.

There is a large amount of carbon in the universe and on Earth, and it widely exists in the atmosphere and the ocean in compound form. Carbon can be extracted as a single substance or as a compound from more than 1,000 kinds of substances. Carbon and hydrogen are both essential elements to human life. They exist in protein, sugar, nucleic acid, amino acids, fat, etc. They can not be digested and assimilated by the intestines even after they are taken into the body and finally excreted with stool. Carbon is porous with a very large surface area, which can effectively absorb odor and color molecules, so it has long been used as a deodorant and de-coloring agent. Normally, the surface area per gram of active carbon is 1000 to 2500 square meters and it can absorb 1000 to 2000 ml hydrogen gas under normal conditions. If carbon can be used as a hydrogen carrier in the food industry, food with strong reducing ability can be achieved.

SUMMARY OF THE INVENTION

According to the invention, carbon is used to absorb hydrogen. The carbon absorbing hydrogen is ingested into the body. Because hydrogen gas is very light, it can not deeply diffuse into the intestinal tract, even after drinking hydrogen-reduced water with dissolved hydrogen. Accordingly, carbon is used as carrier of hydrogen for absorbing hydrogen. The carbon absorbing hydrogen is mixed with food so that enough hydrogen is ingested and released deep into the intestinal tract to reduce the active oxygen level. This invention relates to a method for sealing hydrogen-reduced water or hydrogen-reduced food and the resulting products.

This invention relates to the following capping or sealing methods for obtaining hydrogen-reduced water or hydrogen-reduced food and its corresponding caps or covers.

A capping method for obtaining hydrogen-reduced water uses a plurality of caps having fine carbon particles therein are loaded into a cap catcher in a hydrogen gas atmosphere. After water from a storage tank is filled into an airtight package or container by a filling machine, hydrogen gas or water vapor or both hydrogen gas and water vapor are blown into the container to purge the gas existing in the upper space of the container when capping and packaging with such caps.

A capping method for obtaining hydrogen-reduced food uses a plurality of caps having the fine carbon particles therein are loaded into a cap catcher in a hydrogen gas atmosphere. After the processed food from a storage tank is filled into an airtight package or container by a filling machine, hydrogen gas or water vapor or both hydrogen gas and water vapor are blown into the container to purge the gas existing in the upper space of the container when capping and packaging with such caps.

Water or food is pressed into the filling machine from the storage tank by hydrogen gas.

A plurality of caps or covers including fine carbon particles therein are loaded into a cap catcher in a hydrogen gas atmosphere. After the processed food from the storage tank is filled into the container by filling machine, hydrogen gas or water vapor or both hydrogen gas and water vapor are blown into the airtight container to purge the upper space of the container when capping and packaging with the above caps.

When food is filled into an airtight container, water or an alcoholic cooking liquid or both water and alcoholic cooking liquid are added to the container, and the upper space of the container is purged by the hydrogen gas.

A plurality of caps or covers including fine carbon particles and processed food or unprocessed food therein are loaded into the cap catcher in a hydrogen gas atmosphere, after the water or alcoholic cooking liquid or both water and alcoholic cooking liquid are added to the container, hydrogen gas or water vapor or both hydrogen gas and water vapor are blown into the container to purge the upper space of the container when capping and packaging with the above caps.

In addition to fine carbon particles and processed food or unprocessed food, the cap includes flavorings.

A plurality of caps including fine carbon particles and processed dry food are loaded into a cap catcher in a hydrogen gas atmosphere and capping is performed with the caps. When capping, hydrogen gas or water vapor, or both are blown into the container to purge the upper space of the container.

The carbon fine particles absorb the hydrogen in advance or the hydrogen is absorbed when closing the container.

In addition to fine carbon particles, the cap also includes processed food or unprocessed food or both. Flavoring and processed food or unprocessed food as well as carbon fine particles in the freeze-dried state are all attached to the inside of the cap.

Results of the Invention

The fine carbon particles attached inside the cap absorb a large amount of hydrogen. After capping, the fine carbon particles release hydrogen into the water or processed food in the airtight container. So after production, sufficient hydrogen gas will be dissolved into the water or processed food. Besides, when capping and packaging after the container is filled with food, it is possible to introduce hydrogen gas or water vapor or both from the upper port of the airtight container to drive out any oxygen gas therein so that capping can be performed in a hydrogen gas atmosphere. The hydrogen gas, including that released from the fine carbon particles, can fully dissolve into the water or processed food sealed in the container and so high performance hydrogen-reduced water or hydrogen-reduced food is achieved. As the hydrogen gas is difficult to dissolve in the water, it is possible to enclose the hydrogen gas so that it dissolves into the sealed water or food, i.e., the hydrogen gas contacts the water or processed food within the container. Because hydrogen gas is insoluble, there is not sufficient dissolved hydrogen gas. However, the invention can release the hydrogen into the enclosed container filled with water or processed food so that the hydrogen can fully dissolve in the enclosed container. The water or processed food that can not obtain enough hydrogen in the conventional manner can obtain the dissolved hydrogen in this manner. It can increase the dissolved hydrogen quantity in the food to the maximum dissolving quantity in one liter of water. In fact, the dissolved hydrogen quantity varies with the applied pressure.

When a large quantity of fine carbon particles absorbing hydrogen are ingested together with water or food containing dissolved hydrogen, they bring the hydrogen deep into the intestinal tract. Because the dissolved hydrogen in the water or food begins diffusing instantly when the container is opened, the reducing ability of conventional hydrogen-reduced water decreases before the water or processed food is delivered to the deep portion of the intestinal tract. But with the invention, the fine particles fully absorb the hydrogen and are delivered to the deep portion of the intestinal tract under the pre-condition of protecting the hydrogen in order to reduce and neutralize the active oxygen in the intestine to render it harmless. In the meantime, the carbon will not be digested and assimilated, but excreted harmlessly with stool. In this way, the dissolved hydrogen in the water or food together with the large quantity of hydrogen attached to the fine carbon particles can reduce and neutralize the active oxygen to generate water. This means that it can inhibit acidifying of the water or processed food and extend the shelf life of the water or food and preserve them for a long time. Additionally, the capping methods can be incorporated into conventional process line to use existing equipment to manufacture hydrogen-reduced water or hydrogen-reduced food.

The water or food is delivered from the storage tank to the filling machine by the hydrogen gas and the water or food can be transferred in a hydrogen gas atmosphere before purging the airtight container. In this way, it can increase the hydrogen dissolving efficiency of the water or food.

The cap having fine carbon particles and flavorings therein is placed on a cap catcher in a hydrogen gas atmosphere. In this way, not only fine carbon particles but also the flavorings can absorb the hydrogen. So after the airtight container filled with the food is capped with the above cap, both the fine carbon particles and flavoring release hydrogen. This also increases the dissolving efficiency of hydrogen into the food. As mentioned above, when opening the container, hydrogen instantly begins diffusing and hydrogen absorbed in the flavoring diffuses and its reducing ability is weakened. A large quantity of hydrogen absorbed on the large surface area of the fine carbon particles can be delivered to the deep portion of the intestinal tract. When capping the airtight container filled with food, hydrogen gas or water vapor or both are blown into the container and the oxygen left in the upper space of the container is purged. This increases the dissolving efficiency of the hydrogen into the food in the airtight container and increases its reducing power and so produces hydrogen-reduced food which is decay resistant.

As the cap is attached with flavorings inside, if the unprocessed food is provided in the container, the feed proportioning or flavoring may be performed after capping the container. That means that the food provided in the container is unprocessed and is heated at the preparing stage. When the food is unprocessed, it can be prepared at the stage of sterilization with the omission of a conventional heating process. If the unprocessed food is crab meat and soy sauce and salt are taken as flavorings, all of the ingredients can be placed in the container which is then capped while purging it. At the heat sterilizing stage, boiling water is mixed with the flavorings absorbed inside the cap so that the crab meat is prepared in the container automatically. In addition, processed crab meat and spice flavoring can be mixed at the heat sterilizing stage to prepare the food. In the meantime, the hydrogen being absorbed in the fine carbon particles and flavorings will be released and the air inside the container will be purged. The food inside the container will be prepared under oxygen-free conditions and the hydrogen will be fully dissolved to provide the food with strong reducing capacity that does not easily decay.

In addition, when the food in the airtight container is unprocessed, such as raw tea used for black tea, both the raw tea packed in a small filter paper bag and water are poured into the container, and the container is purged while capping. At the heat sterilizing stage, the boiling water is mixed with the raw tea and then the raw tea used for the black tea can be extracted. By this time, the flavoring attached to the inside of the cap is mixed with the boiled water. If sugar or milk is used as flavoring, the sugar or milk will be mixed with water for flavoring at the same time when the black tea is extracted. Besides, when the processed food is raw tea for the black tea, the black tea water extracted is poured into the container. If there is no mixture of sugar and milk or sugar or milk, they can be attached to the inside of the cap as flavoring in advance, and in this way, to prepare the food by mixing with the black tea water made of boiled water. The cap absorbs the flavoring inside in advance, especially when the unprocessed food is capped in an airtight container. The food can also be prepared during the heat sterilizing process. Conventionally, heat sterilization is an essential process in preparing beverages, canned food, and the like but this invention can omit this process.

In addition to fine carbon particles, the processed or unprocessed food is also absorbed in the cap, and in the hydrogen gas atmosphere, the cap is loaded onto the cap catcher. This makes not only the fine carbon particles but also the processed or unprocessed food adsorb the hydrogen. So after the food is placed in the airtight container, when capping the container, hydrogen gas or water vapor or both are blown into the upper part to purge the air so that both fine carbon particles and food are completely capped in the container in a hydrogen gas atmosphere. The result is that, hydrogen can fully dissolve into the food and provide hydrogen-reduced food which is decay resistant.

The processed or unprocessed food is absorbed into the inside of the cap. The food can be prepared by seasoning and flavor treatment as the container is filled with water or alcohol or flavoring liquid. The processed food is absorbed within the cap and is heated at the preparing stage, while if the unprocessed food is absorbed within the cap and is capped after poured into the container, it can be prepared while sterilizing. This omits heat sterilization. For example, for the unprocessed food such as crab meat, use the soy sauce, mirin, etc. as flavoring liquid and fill them in an airtight container. When capping, purge the air from the container and at the heat sterilization stage, mix with boiled flavoring liquid. The crab meat under the cap can be prepared by the seasoning in the capping state. In addition, if the crab meat under the cap is processed, water, oil, and flavoring are added to the container. They can be boiled and mixed during the heat sterilization process so the crab meat can also have flavor treatment. As mentioned above, the result is that, with the purging effect, both the fine carbon particles and food are well enclosed in the container in a hydrogen gas atmosphere to make the hydrogen fully dissolve to produce hydrogen-reduced food with a strong ability to prevent decay.

If the unprocessed food such as raw tea for black tea and fine particles are absorbed inside the cap, first fill water and flavoring liquid such as milk or sugar, etc. into the container, then purge and cap the container at the same time. At the heat sterilization stage, the boiling water or milk or sugar, is mixed with raw tea. The unprocessed food not only can be extracted from the enclosed container in the capping state but also can be seasoned. Besides, if the processed food absorbed to the inside of the cap, as the extracted tea water can not be easily absorbed in the cap, it will be freeze-dried into powder or granulates and together with fine carbon particles absorbed to the inside of the cap. In this way, if the above black tea water has been seasoned, then only fill water, flavoring liquids such as milk or sugar are added to the container. These ingredients are mixed and seasoned at the heat sterilization stage. In addition, if the unprocessed food such as wine is to be adsorbed to the inside of the cap, the adsorption is not easy, the food extract can be freeze-dried into powder or granulates to be absorbed to the inside of the cap. Alcohol can be added to the container which can be purged and capped at the same time. At the heat sterilization stage, the food is mixed with the alcohol, the extract absorbed to the inside of the cap is dissolved, and the alcohol seasoning can be prepared. For a non-extracted beverage like wine, freeze-drying may be used due to difficult adsorption, but if the cap is formed to make it possible to absorb the liquid directly, it can absorb the liquid too.

The fine carbon particles and the flavorings in addition to the processed or unprocessed food are absorbed to the inside of the cap. In this case the water or alcohol or other flavoring liquid originally expected to be provided in the container in advance and the flavorings expected to be absorbed to the inside of the cap can be classified as required. For example, the processed food is prepared before capping, but if it is desired to treat its taste or aroma at the final stage, the flavorings can be attached to the cap, and after capping, mixed with the food at the heat sterilization stage. On the other hand, if the unprocessed food is not prepared before capping, it needs flavor treating even more. For this reason, the flavoring liquid such as soy sauce can be provided in the container or attached to the inside of the cap.

The prepared dry food is absorbed to the inside of the cap. As it is dried in the preparing state, the airtight container can be enclosed with the cap directly. That means, as the processed dry food is absorbed to the inside of the cap and usually eaten in a dry state, it does not need a special storage tank nor the filling operation into the container. The prepared dry food, for example, dry beef, dry pineapple, is dried after flavor treating. After they are absorbed to the inside of the cap, the container can be purged and capped with the above cap at the same time. Because both the fine carbon particles and food are enclosed in a hydrogen gas atmosphere, hydrogen-reduced food can be obtained which fully absorbs the hydrogen with reduced capacity for decaying.

The cap of the airtight container is absorbed with a large quantity of fine carbon particles inside in advance. After capping, the hydrogen can fully dissolve into the beverage or food enclosed in the airtight container. The result is the absorbed fine carbon particles in large quantities can be delivered to the deep part of the intestinal tract. The fine carbon particles will not be digested but assimilated by the intestine and finally excreted harmlessly with stool. The caps are not only the screw-type cap, tin can winding-up cap, and the like, but also other caps for all containers in which food is filled and enclosed.

The cap of the container can absorb, besides the fine carbon particles, the processed or unprocessed food or flavorings or both processed/unprocessed food and flavorings, so that all of the fine carbon particles and the processed/unprocessed food and flavorings can fully absorb a large quantity of hydrogen, and the food enclosed in the airtight container can absorb even more hydrogen and let the hydrogen dissolve in it. Besides, after the fine carbon particles absorbing a large quantity of hydrogen are eaten, the hydrogen can be delivered to the deep portion of the intestinal tract and reduce and neutralize the active oxygen in the intestinal tract. In addition to the above, as the food needs to be heated before being filled into the container, which will result in the acidifying of food and diminishing its taste, by using the cap according to the invention, the preparation of food can be performed by heat sterilization after the capping of the container, thereby omitting the conventional heat seasoning. Moreover, the food can be prepared in an oxygen-free state, which provides an unprecedented taste.

The flavoring absorbed to the inside of the cap and the processed or unprocessed food in freeze-drying state into the composition attached to the inside of the cap together with the fine carbon particles increases the cap's adhesive force. Additionally, to mix and freeze-dry the flavoring or processed or unprocessed food and fine carbon particles, one can also combine starch or glucide and attach them to the inside of the cap. Also, the food bag or filtering package containing the food can be set inside the cap. It is also possible to form the food inside the cap.

BRIEF DESCRIPTION OF THE FIGURES

FIG. 1 shows a bottle cap 1 while FIG. 2 shows a can cap 1. In this invention, what is filled in the container or package 4 is hydrogen-reduced water or hydrogen-reduced food, so the cap for the airtight aluminum container such as an aluminum packaging bag or an aluminum can is used. The inner side of the cap opposite the food will adsorb fine carbon particles 2 when sealing or capping. The fine particles are made of carbon allotropes, including active carbon, which are designed for the carbon fine particles. Generally, the surface area for 1 g of active carbon is 1000 to 2500 square meters, which can absorb 1000 to 2000 ml of hydrogen under normal condition. The cap can be classified into two forms: loading fine carbon particles into a cap catcher in a hydrogen atmosphere to adsorb the hydrogen; or after the container is sealed with food inside, the carbon fine particles adsorb the hydrogen. For hydrogen adsorption after capping the container or package, when purging the air inside the container, except the hydrogen gas blown in, the hydrogen in the air or the hydrogen in the water may be absorbed by fine carbon particles. With the invention, the hydrogen is much more absorbed by the carbon fine particles than dissolved in the water or food so it can remove the active oxygen in the intestinal tract more effectively. As mentioned above, the fine carbon particles adsorb a large quantity of hydrogen under normal conditions. The lines 3 represent the direction in which hydrogen is released into the container. Because they absorb purging hydrogen or the hydrogen released from the water or food in the capped container, the hydrogen in the air or water can be used for capping and it is not necessary to specify capping by loading into cap catcher in a hydrogen atmosphere. Alternatively, the particles 2 may comprise flavoring, processed or unprocessed food instead of fine carbon particles. The flavoring includes all the ingredients for preparing, seasoning, and blending. In addition, the food includes all the food stuffs except water, such as beverages, meat, vegetables, or fruit. The processed food includes beverages and all the foods that have been seasoned or flavor treated. The unprocessed food includes beverages and all the foods not seasoned or flavor treated. When attaching the prepared food or unprepared food to the inside of the cap, because the attachment is difficult, except by freeze-drying, it is also possible to design the inner side of the cap to retain the food easily, or design a support for putting food such as tea in a packaging bag or filter bag in advance and releasing it after being inserted into the container.

Preparation of Extracted Beverage

Figure 1:
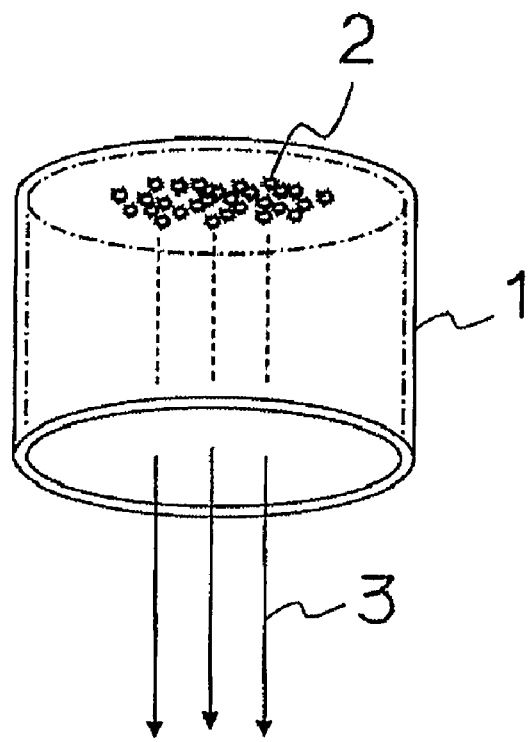
FIG. 1 shows the cap for a bottle according to the invention.
Figure 2:
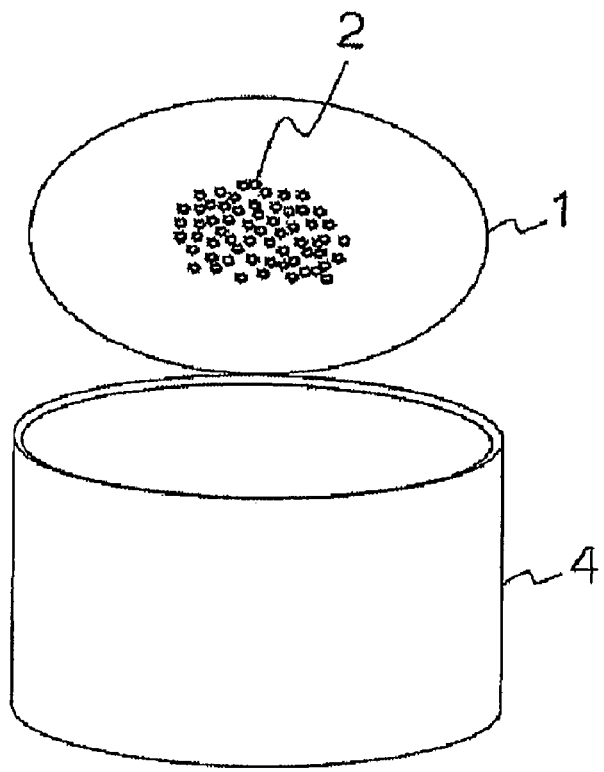
FIG. 2 shows the cap for a can according to the invention.
Figure 3:
FIG. 3 is a manufacturing flow diagram for an extracted beverage.
Figure 3:
Figure 3:
Figure 3:
Figure 3:
Figure 3:

FIG. 3 is a general manufacturing flow diagram for an extracted beverage. Extracted beverages are made by the extract taken from tea leaves or beans, including green tea, black tea, oolong tea, coffee, etc. For the extracted beverage, mix the raw ingredients of the extracted beverages like tea or coffee, except the water, and then draw out the extract by heating. The extracted beverage is mixed with milk or sugar, etc. in blending storage jar, and then inserted into the container. The container is then capped, heated and sterilized before bale packing and shipping. In the conventional production process of an extracted beverage, the extract is heated and heat sterilized, both of which acidify the food and diminish its taste and lead to decay.

Preparation of Non-Extracted Beverage

Figure 4:
FIG. 4 is a manufacturing flow diagram for a non-extracted beverage.
Figure 4:
Figure 4:
Figure 4:
Figure 4:
Figure 4:

FIG. 4 is a general manufacturing flow diagram for a non-extracted beverage. Non-extracted beverages include fruit beverages, wine, soda, sports drinks, and the like, which can not be made by drawing out the extract. There are a great variety of non-extracted beverages without a general manufacturing method. Here we presume that the non-extracted beverage refers to raw ingredients before the blending operation. For example, in the case of orange juice, it is squeezed from an orange and is the raw material without blending with the sugar syrup, or the like. In the case of wine, it is brewed and is the raw material without blending with the alcohol. First, mix the raw material of the non-extracted beverage with the sugar or alcohol, etc. in a blender or jar and prepare before storage. Then insert it into the container via a filler and after that, cap the container. Then heat and sterilize each container before bale packing and shipping. The conventional non-extracted beverage production process has no heating operation as mentioned above in the extraction process, but it is necessary to heat when blending the raw materials in the blender or storage tank and acidification can not be avoided in blending.

General Preparing Method of Canned Food

Figure 5:
FIG. 5 is a manufacturing flow diagram for canned food.
Figure 5:
Figure 5:
Figure 5:
Figure 5:
Figure 5:

FIG. 5 is a general manufacturing flow diagram for canned food. Here the canned food is meat, vegetables or, fruit, or the like except beverages. First, prepare the raw materials for the food and then season and store it. For the stored processed food, determine its contents and then insert it into the container and then cap the container. After capping, heat and sterilize each container before bale packing and shipping. In conventional preparation and sterilization of food, the food must be heated during these two operations thereby acidifying and decaying the food and diminishing its taste.

EXAMPLE 1

Figure 6:
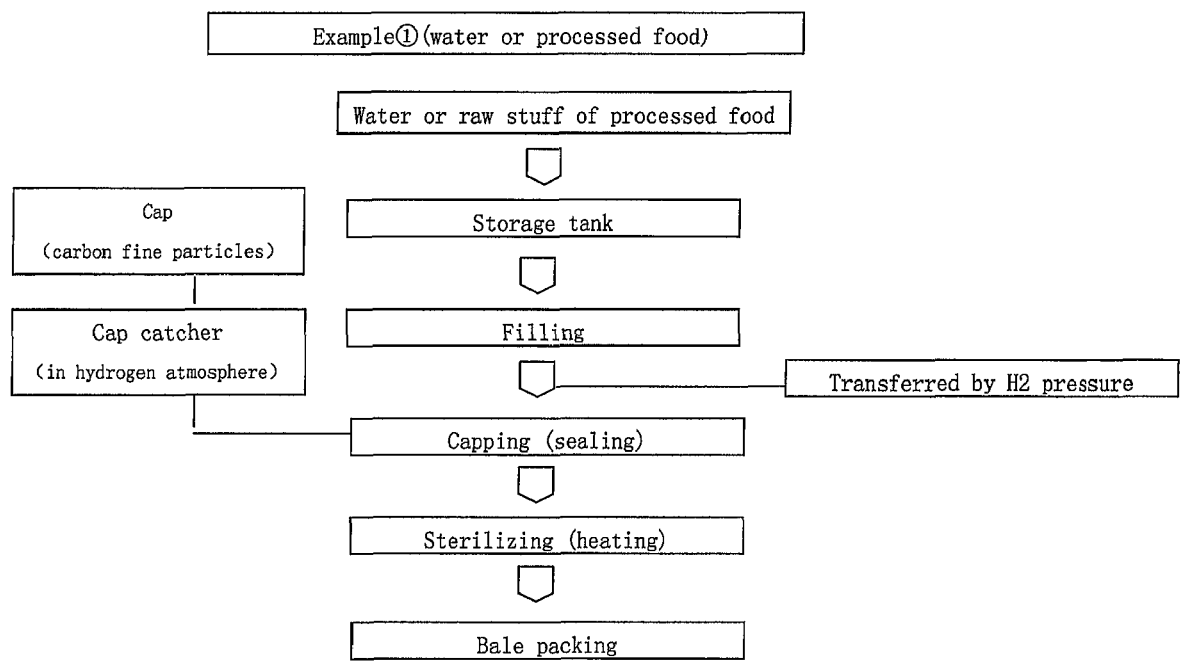
FIG. 6 is a flow diagram for hydrogen reduced food as water or processed food with a capping method according to the invention.

FIG. 6 is a flow diagram for hydrogen-reduced food as water or processed food with a capping method. Processed food means all process extracted beverages and non-extracted beverages, and includes canned foods such as meat, vegetables, fruit, etc. In these cases, only fine carbon particles are attached to the inside of the cap and the cap is loaded into a cap catcher in hydrogen atmosphere. Also, the airtight container is filled with water or processed food. Generally, the water has been sterilized and the processed food has been prepared by seasoning and contains oil, vinegar, etc. In this invention, the fine carbon particles are attached to the inside of the cap and a plurality of caps are loaded into the cap catcher in a hydrogen atmosphere. Because the inside of the cap catcher is under high pressure and at ultra low temperature, the above-mentioned fine carbon particles adsorb a large quantity of hydrogen. The fine carbon particles to be attached to the inside of the cap are carbon allotropes including active carbon in the size from a micrometer to a nanometer. The adsorption method includes but is not limited to, mixing the fine carbon particles with starch and glucide harmless to the human body to provide the material with a binder, and then spray the material onto the inside of the cap. Also, when capping the container, the jet nozzle is set to blow hydrogen gas or water vapor or both into the upper port of the container, usually at the storage tank or beside the filling machine. First, store the water or processed food in the storage tank and add it to the vacuum package via the filling machine. Once the water or processed food are filled into the container, the container is capped with the cap loaded into the cap catcher while from the above jet nozzle, hydrogen gas or water vapor or both is blown into the upper port of the container to purge the air of oxygen. In a hydrogen atmosphere after purging, and after the container is capped by the cap catcher, each container is heated and sterilized before bale packing and shipping. As mentioned above, because a large quantity of fine carbon particles are attached to the inside of the cap, when capping, the above fine carbon particles will release hydrogen into the water or processed food in the container and hydrogen will be dissolved into the water or processed food. The heat sterilization will also speed up the release of the hydrogen absorbed on the fine carbon particles. In this way, in an oxygen-free state, dissolution of hydrogen into water or processed food is facilitated. As a result, hydrogen-reduced water or hydrogen-reduced food is obtained with the reducing ability exceeding −700 mV from a point of hydrogen reduction potential. Further, as shown in FIG. 6, the water or processed food in the storage tank is pressed into a filling machine by the pressure of the hydrogen gas, and before purging or contacting the enclosed hydrogen, the water or processed food is provided in a hydrogen atmosphere. In this way, for water or processed food, at the stage of filling and capping a vacuum package or container, hydrogen-reduced water or hydrogen-reduced food is obtained with a very high content of dissolved hydrogen. When implementing this invention, only add the simple equipment is added to a conventional production line.

EXAMPLE 2

Figure 7:
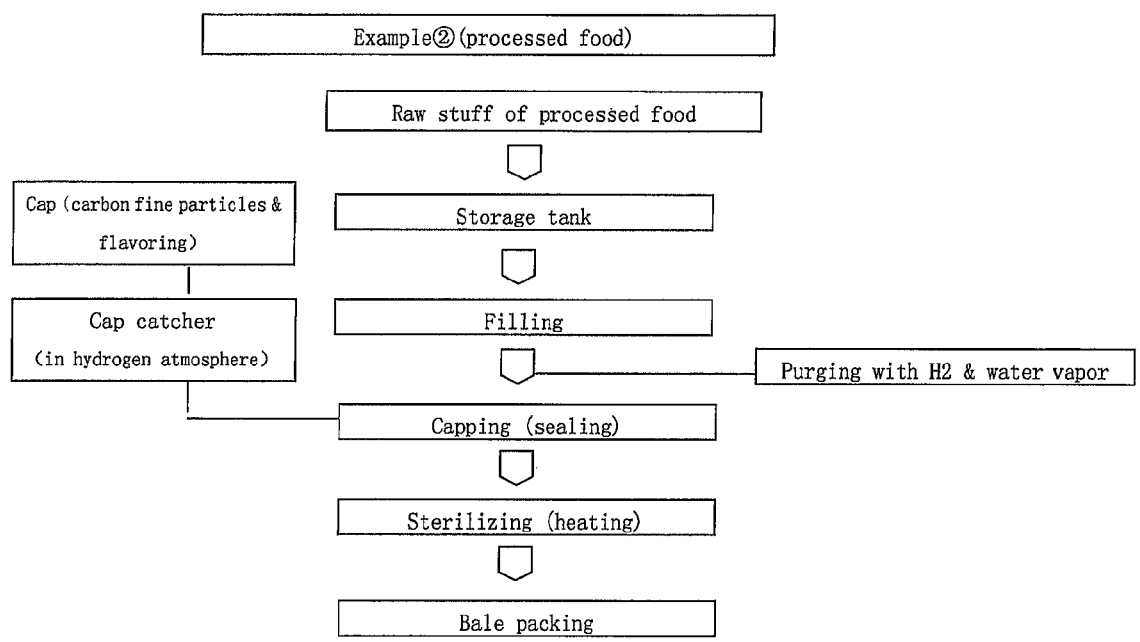
FIG. 7 is a diagram for hydrogen-reduced food as processed food with the capping method according to the invention.

FIG. 7 is a flow diagram for hydrogen-reduced food as processed food with an alternate capping method. FIG. 7 shows an example for reduction of the processed food with the fine carbon particles and flavorings attached to the inside of the cap. In this example, processed food means all canned food, including all extracted beverages after being processed, non-extracted beverages, meat, vegetables, fruits, etc. The major difference in this example is that besides the fine carbon particles, flavorings are attached to the inside of the cap. Flavorings include all the raw ingredients for preparing, seasoning or proportioning for food, including oil, vinegar, sugar syrup, etc. The flavorings are in powder or granular form, and they are mixed with starch in the same manner as the above-mentioned carbon particles, and then absorbed to the inside of the cap. Both soy sauce and mirin are liquids and difficult to be absorbed, so they are freeze-dried into powder or granules and then mixed with the above ingredients and then absorbed by the fine carbon particles. However, it is possible to construct the inside of the cap so that it absorbs the liquid without freeze-drying.

In the example of FIG. 7, the food is processed food that has been prepared by flavor treatment which needs to be treated in taste or aroma at the end. Spices can meet the needs of this taste or aroma treatment. For example, if the processed food is stewed vegetables, the aroma can be enhanced at the end by adding the desirable spices as flavorings. To mix it with the stewed vegetables at the heat sterilization stage can finish the aroma treatment. If the processed food is coffee and it is desired to add milk at the end, the freeze-dried milk can be absorbed as flavoring and mixed at the heat sterilizing stage to finish the taste treatment. In this working example, the processed food is initially stored in a storage tank and then poured into the airtight container via a filling machine and then capped with the above cap while purging with hydrogen gas or water vapor or both blown from the jet nozzle at the upper port of the container to drive out the oxygen from within the container. The capping operation is in a hydrogen atmosphere and each airtight container is heated and sterilized before bale packing and shipping. As mentioned above, because a large quantity of fine carbon particles are attached to the inside of the cap, after capping, the above fine carbon particles will release the hydrogen into the water or processed food in the container and the hydrogen will also be dissolved into the water or processed food. The flavorings are also attached to the inside of the cap except the fine carbon particles. The hydrogen is also dissolved into the flavoring to enhance the dissolution of the hydrogen in the food via the cap catcher in a hydrogen atmosphere. It is possible to use the cap having fine carbon particles and flavorings attached thereto turn the processed food into hydrogen-reduced food with high reducing ability. Besides, with the absorbed flavoring, the flavoring treatment is finished during heat sterilization.

EXAMPLE 3

Figure 8:
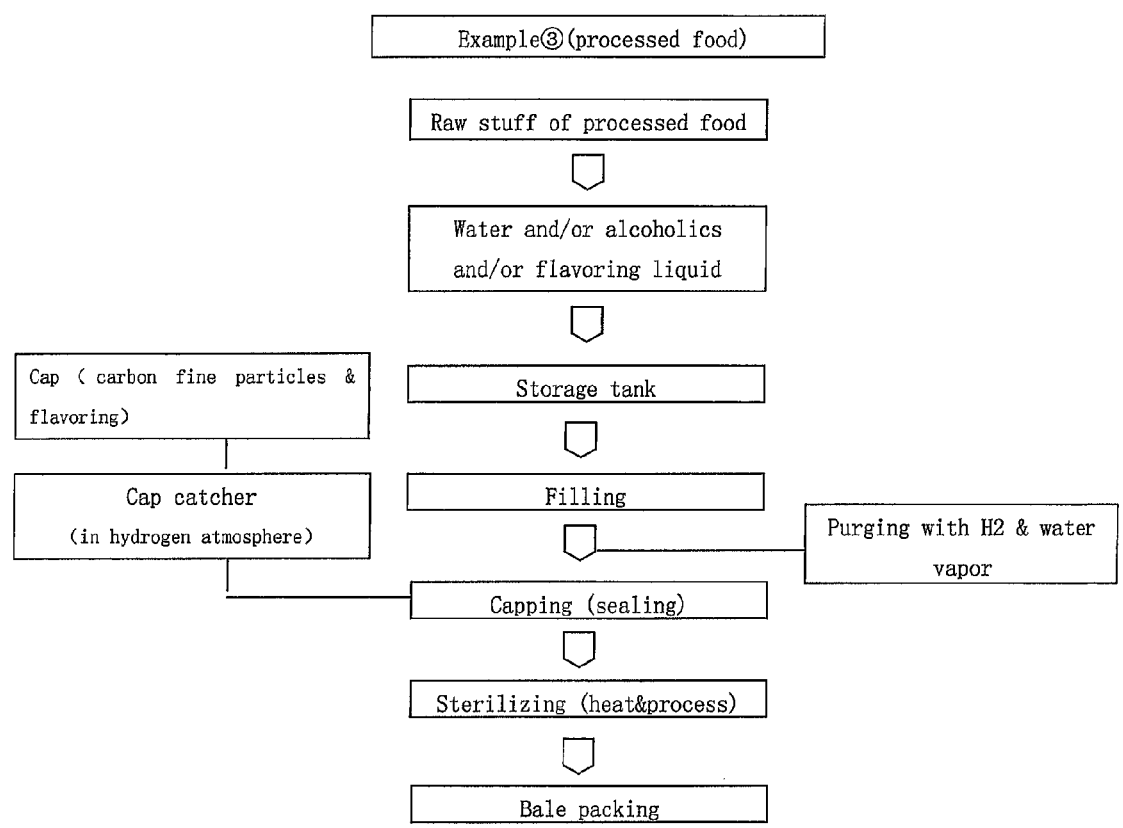
FIG. 8 is a flow diagram for hydrogen-reduced food as processed food with the capping method according to the invention.

FIG. 8 is a flow diagram for hydrogen-reduced food as processed food with a further capping method suitable for all processed or unprocessed foods. FIG. 8 illustrates hydrogen reduction of the processed food with the fine carbon particles and flavorings attached to the inside of the cap. It is designed for filling water or alcohol or flavoring liquid into the airtight container. In this example, processed food means all prepared extracted beverages and non-extracted beverages as well as canned foods of meat, vegetables, fruits, etc. and both the fine carbon particles and flavorings are attached to the inside of the cap. This example is similar to example 2 except for filling water or alcohol or flavoring liquids into the airtight container. The food may need to be combined with water or be seasoned although the food has been prepared. For example, in case of processed crab meat, to enhance its taste, it is necessary to add flavoring liquid including oil, etc. to make it taste better. Another example is processed orange juice. In order to increase its sweetness, sugar syrup may be added. This example is suitable for the above two cases. In this example, the processed food is prepared and mixed with the water or alcohol or flavoring liquids and then stored in a storage tank. The food is then poured into the airtight container via filling machine. As with the above-mentioned process, the container is purged while capping it with the cap attached with the fine carbon particles and flavorings inside the cap catcher in a hydrogen atmosphere. Each container is heated and sterilized before bale packing and shipping. In this example, the flavorings are attached to the inside of the cap. If taste or aroma treatment is desired, attach the flavorings to the inside of the cap in advance, and then mix the flavorings with the food at the heat sterilization stage to finish the taste and aroma treatment. In this way, other examples with the fine carbon particles and flavorings attached to the inside of the cap, in which prepared food, water or alcohol or flavoring liquid are filled into the airtight container can also make the processed food into the high quality hydrogen-reduced food with strong reducing ability. Because of the attached flavorings, at the heat sterilization stage, it is also possible to produce taste and aroma treatment.

EXAMPLE 4

Figure 9:
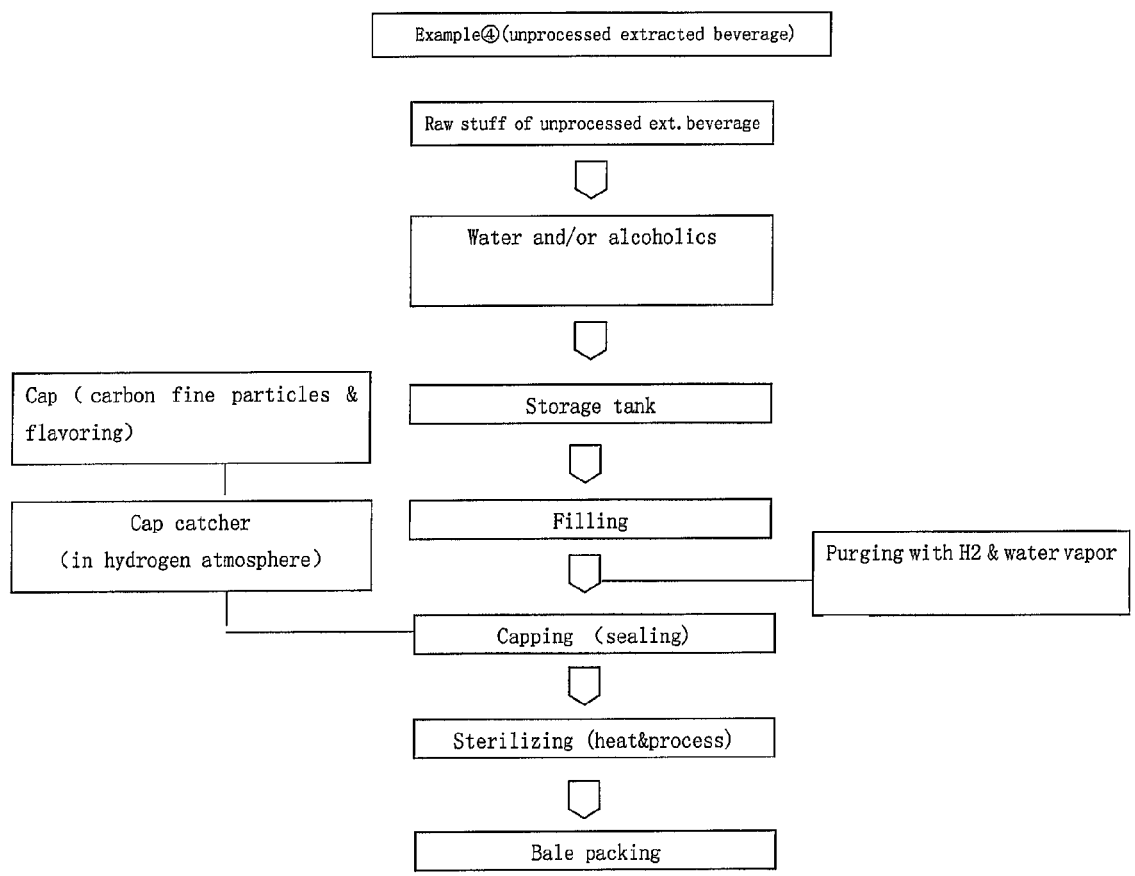
FIG. 9 is a flow diagram for hydrogen-reduced food as unprocessed non-extracted beverage with the capping method according to the invention.

FIG. 9 is a flow diagram for the hydrogen-reduced food as unprocessed non-extracted beverage with a further capping method suitable for all processed or unprocessed foods. FIG. 9 illustrates hydrogen reduced unprocessed extracted beverage with fine carbon particles and flavorings adsorbed by the inside of the cap. To extract the beverage liquid, water or alcohol or favoring liquids are poured into the airtight container. Unprocessed extracted beverage refers to beverage not extracted or seasoned. For example, the unprocessed extracted beverage is oolong tea, which is not extracted or seasoned raw oolong tea. Then the extracted oolong tea water solution will be filled into the airtight container. For example, the unprocessed extracted beverage is oolong tea to be treated with alcohol, which is likewise not extracted or seasoned. Then, to change the taste of the extracted oolong tea solution, alcohol is delivered to the airtight container. This example describes how raw ingredients of the unprocessed extracted beverage are mixed with water or alcohol and how the mixture is stored in the storage tank. The mixture is then poured into the airtight container by the filling machine. The container is purged as described above while capping with the cap attached with the fine carbon particles and flavorings inside in the cap catcher in a hydrogen atmosphere. Each capped container is heated and sterilized before bale packing and shipping. According to this example, in the above-mentioned heating and sterilizing, water or alcohol enclosed in the airtight container may boil, so the tea will boil up for the first time and oolong tea liquid is extracted. In the meantime, flavorings adsorbed to the inside of the cap will also be blended so the seasoning operation is also completed during heating and sterilizing. The release of hydrogen from the carbon will speed up due to heating and being in the oxygen-free capping state, and a large quantity of hydrogen will be dissolved into the extracted beverage. Other results are as mentioned above. It is important to note that conventional heating for extraction is omitted.

EXAMPLE 5

Figure 10:
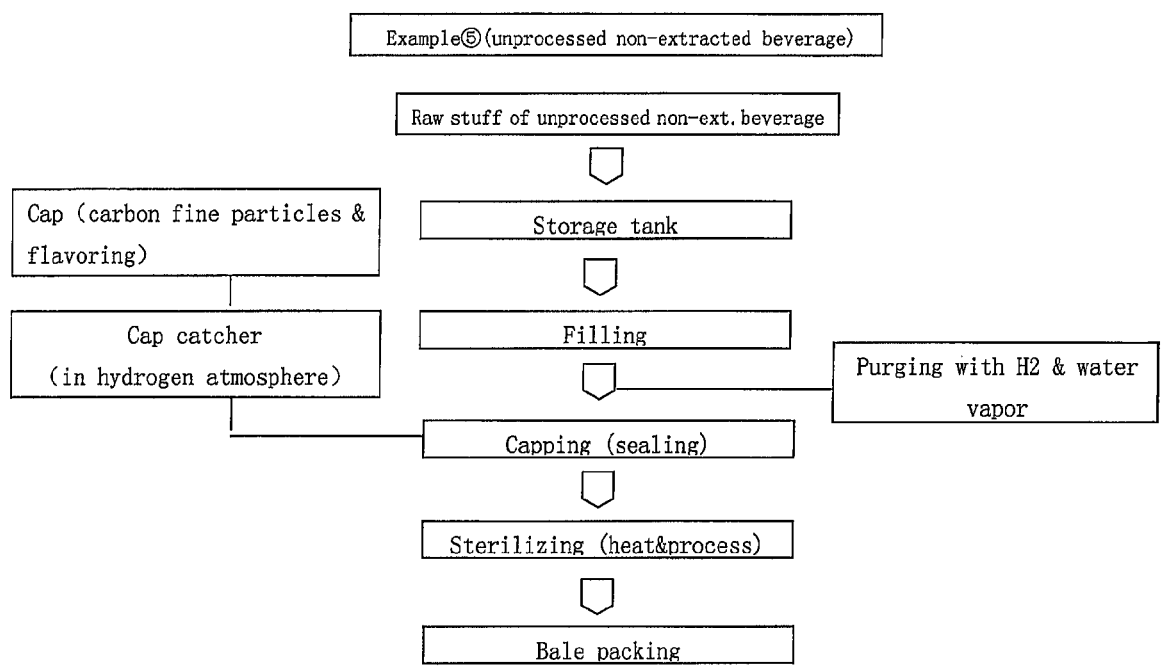
FIG. 10 is a flow diagram for hydrogen-reduced food as unprocessed non-extracted beverage with the capping method according to the invention.

FIG. 10 is a flow diagram for the hydrogen-reduced food as an unprocessed non-extracted beverage with a further capping method suitable for all processed or unprocessed foods. FIG. 10 illustrates the hydrogen-reduced food as an unprocessed non-extracted beverage with the fine carbon particles and flavorings attached to the inside of the cap. The unprocessed non-extracted beverages refer to the non-extracted beverages that are not seasoned, such as wine, fruit beverage, carbonated water, sports drink, etc. For example, the unprocessed non-extracted beverage is a brewed wine. The alcohol content is adjusted but not the taste. Orange juice is the juice extracted from an orange but its taste is not changed. Since it is nearly finished as a beverage, it is suitable for the cases in which the water, alcohol, etc. are not needed. This is not illustrated in the drawing. But only water or alcohol or flavoring liquid need to be added before filling into the container. This is the same as in other examples. In this example, unprocessed non-extracted beverage is stored in storage tank and then added into the airtight container by a filling machine. Then, as described above, the container is purged while capping it with the cap attached with fine carbon particles and flavorings inside in the cap catcher in the hydrogen atmosphere. Each capped container is heated and sterilized before bale packing and shipping. In the heating and sterilizing process as mentioned above in this example, the wine or orange juice in the airtight container may boil up and mix with flavorings attached to the inside of the cap. So, it is possible to adjust the taste and flavor during the heating process. Other results are the same as mentioned above.

EXAMPLE 6

Figure 11:
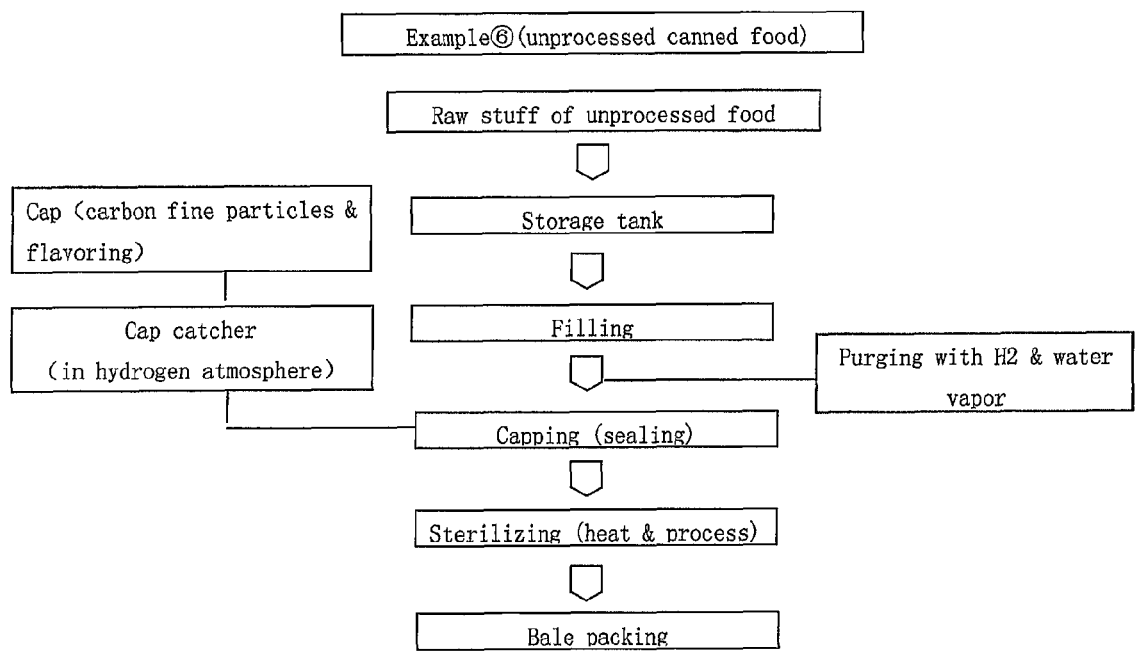
FIG. 11 is a flow diagram for hydrogen-reduced food as unprocessed canned food with the capping method according to the invention.

FIG. 11 a flow diagram for hydrogen-reduced food as unprocessed canned food with another capping method suitable for all processed or unprocessed foods. FIG. 11 illustrates the hydrogen-reduced food as unprocessed canned food with the fine carbon particles and flavorings attached to the inside of the cap. Water or alcohol or flavoring liquids are added to the airtight container. The unprocessed canned food refers to all unprocessed foods except water and beverages such as meat, vegetables, fruits, etc. Water or alcohol or flavoring liquids for making of these foods are added to the airtight container together. In one example, the unprocessed food is crab meat. To season the crab meat, flavoring liquid such as soy sauce, etc. and water are added to the airtight container together. Boiled crab meat is also a suitable unprocessed food in this invention. In this example, the unprocessed food raw ingredient and water or alcohol or flavoring liquids are initially mixed and then the mixture is stored in a storage tank. The mixture is added to an airtight container by a filling machine. Then, as described above, the container is capped with the cap having fine carbon particles attached thereto and flavorings inside in the cap catcher in a hydrogen atmosphere. The container is heated and sterilized before bale packing and shipping. In the above-mentioned sterilizing and heating process, the water or alcohol or flavoring liquids enclosed in the airtight container may boil up so the food (crab meat) is cooked for the first time. In the meantime, the flavorings adsorbed by the inside of the cap will also be blended so the seasoning operation is also performed during the heating and sterilizing. Other results are as mentioned above. It is important to note that the conventional heating operation for extraction is omitted.

EXAMPLE 7

Figure 12:
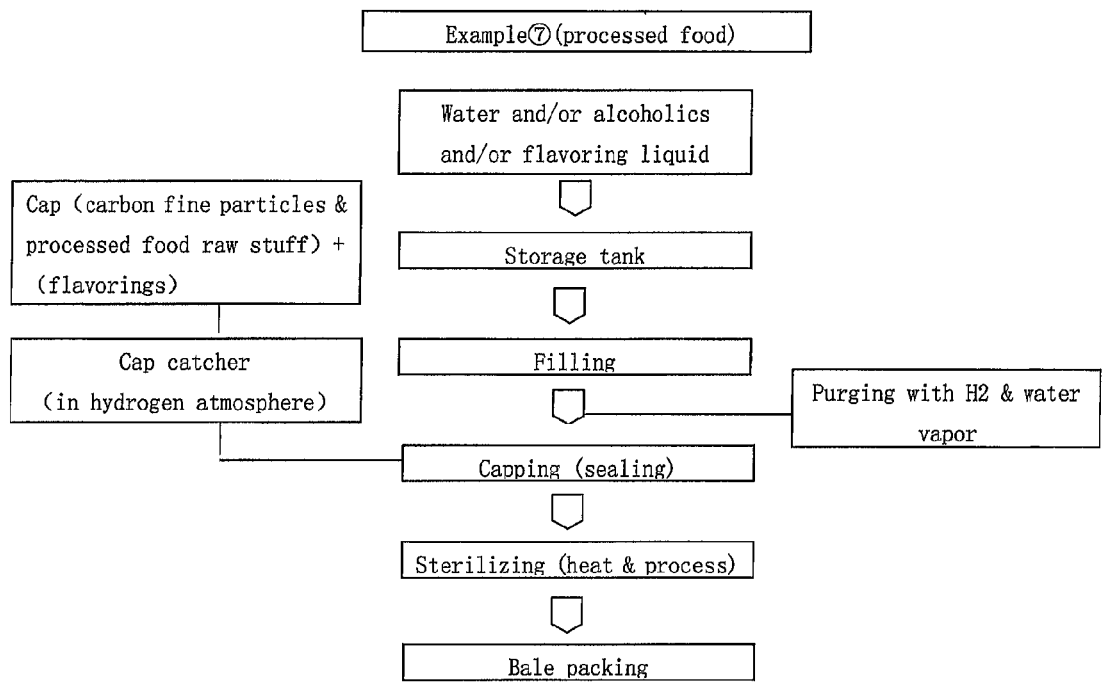
FIG. 12 is a flow diagram for hydrogen-reduced food as processed food with the capping method according to the invention.

FIG. 12 is a flow diagram for the hydrogen-reduced food as processed food with a capping method applicable to all processed or unprocessed food. FIG. 12 illustrates hydrogen reduced food as processed food with fine carbon particles attached to the inside of the cap and water or alcohol or flavoring liquids added to the airtight, i.e. as the water or alcohol or flavoring liquids are added to the airtight container, the processed food and fine carbon particles are both absorbed by the inside of the cap. The processed food is the same as mentioned above, including all processed extracted beverages and non-extracted beverages as well as canned food such as meat, vegetables, fruits, and the like. In one example, the processed food is seasoned crab meat. To enhance the taste and flavor of the crab meat, flavoring liquid containing oil is added to the airtight container. In another example, the processed food is orange juice. To enhance a sweet taste to the extracted orange juice, sugar juice is added to the airtight container. This example is the same as described above. The processed food described in this example is adsorbed to the cap and can be freeze-dried due to the difficulty of adsorption. In the case of orange juice adsorbed to the inside of the cap, it is easy to freeze-dry it into powder and granulates. Therefore, it can be mixed with the ingredients such as starch or glucide (mix and completely agitate) and then attached to the cap. Where crab meat is adsorbed, it is initially freeze dried. The inside of the cap is constructed to be capable of absorbing and retaining the food. The cap catcher is usually at high pressure and ultra low temperature. If the ingredient is absorbed, the absorption is firm even for the crab meat. In this example, water or alcohol or flavoring liquid is stored in a storage tank and then added to an airtight container which is capped with the above-mentioned cap. At this moment, hydrogen gas or water vapor or both are blown from a jet nozzle to purge the upper space of the container and drive out the oxygen for capping the container in a protective hydrogen atmosphere state. After capping of the airtight container, the food is heated and sterilized together in the container before bale packing and shipping. In this way, the food enclosed in the airtight container as mentioned above, and the fine carbon particles attached to the inside of the cap adsorb a large quantity of hydrogen, and the hydrogen is released and dissolved into the processed food enclosed in the container. In addition to fine carbon particles, the processed food is also absorbed to the inside of the cap, and the processed food also adsorbs the hydrogen by being loaded in the cap catcher. Purging of the container while capping it further enhances the dissolving efficiency of the hydrogen into the food. As described above, using a cap having fine carbon particles attached thereto provides the processed food in the form of hydrogen-reduced food with strong reducing capacity. In addition, fine carbon particles and processed food and flavorings adsorbed to the inside of the cap, during the sterilizing and heating process provides the final taste treatment.

EXAMPLE 8

Figure 13:
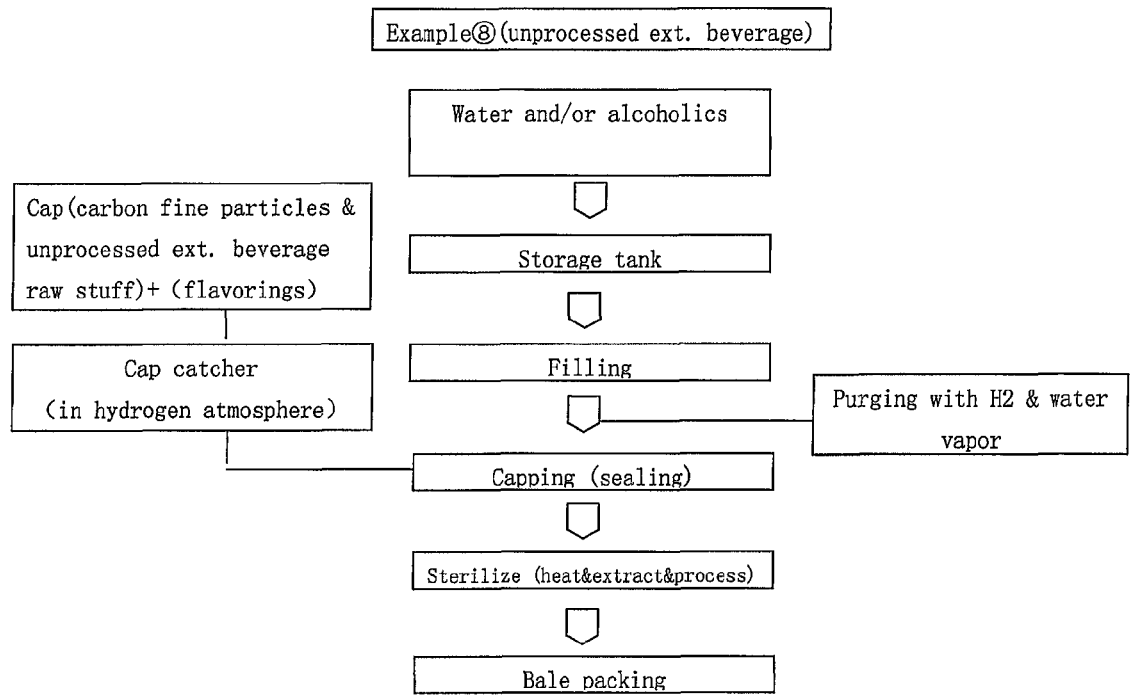
FIG. 13 is a flow diagram for hydrogen-reduced food as unprocessed extracted beverage with the capping method according to the invention.

FIG. 13 is a flow diagram for hydrogen-reduced food as an unprocessed extracted beverage with the capping method for all processed or unprocessed food. FIG. 13 illustrates the unprocessed extracted beverage with hydrogen reduced food and fine carbon particles attached to the inside of the cap and water or alcohol added to the airtight container. As the water or alcohol is added to the airtight container, both the unprocessed extracted beverage and fine carbon particles are adsorbed to the inside of the cap. The unprocessed extracted beverage, as mentioned above, is not extracted or seasoned. For example, the unprocessed extracted beverage is oolong tea, which is not extracted or seasoned. The extracted oolong tea water solution is added to an airtight container. For example, the unprocessed extracted beverage is oolong tea to be treated with alcohol, which is likely not extracted or seasoned. To change the taste of the extracted oolong tea solution, alcohol, etc. is added to the airtight container. The raw ingredients of unprocessed extracted beverage are adsorbed to the cap is as described above. The general practice (but not limited thereto) is to mix the tea and fine carbon particles with the starch or saccharide and to absorb them together. In this example, water or alcohol is stored in a storage tank. Then, after adding the ingredients to an airtight container by filling machine, the container is purged while capping it as described above, and then capped with the cap having fine carbon particles attached thereto and leaving unprocessed extracted beverages in the cap catcher in the hydrogen atmosphere. The capped container is heated and sterilized before bale packing and shipping. According to this example, in the sterilizing and heating process, water or alcohol in the airtight container may boil up. The tea is boiled for the first time and the oolong tea liquid is extracted in this process. The flavoring is also absorbed to the inside of the cap for later mixing for final taste and flavor treatment possibly during the heating and sterilizing process. It should be noted that the conventional heating operation for extraction is omitted.

EXAMPLE 9

Figure 14:
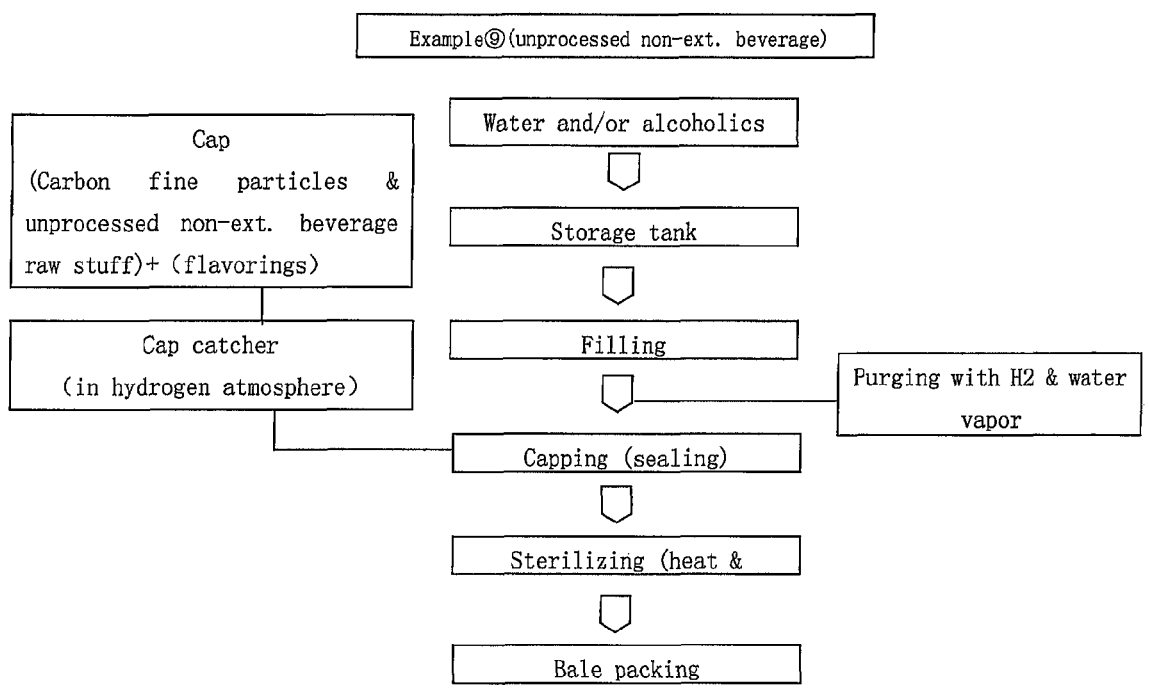
FIG. 14 is a flow diagram for hydrogen-reduced food as unprocessed non-extracted beverage with the capping method according to the invention.

FIG. 14 is a flow diagram for hydrogen-reduced food as unprocessed non-extracted beverage using capping method suitable for all processed or unprocessed food. FIG. 14 illustrates unprocessed non-extracted beverage with hydrogen reduced food and fine carbon particles attached to the inside of the cap and water or alcohol are added to an airtight container. As the water or alcohol is added to the airtight container, both the unprocessed non-extracted beverage and fine carbon particles are adsorbed to the inside of the cap. As mentioned above, the unprocessed non-extracted beverages refer to non-extracted beverages that are not seasoned such as wine, fruit beverage, carbonated water, sports drink, and the like. In this example, the unprocessed non-extracted beverage is brewed wine. The alcohol content is adjusted but not the taste. Orange juice is the juice extracted from an orange but its taste is not adjusted. The unprocessed non-extracted beverage in this example is absorbed to the inside of the cap as is the wine or orange juice after it is formed into freeze dried powder or granulates. It is necessary to add water or alcohol to the airtight container. In this example, water or wine is stored in a storage tank and then added to the airtight container by the filling machine. The container is then purified while capping it in the same manner as described above with the cap having fine carbon particles attached thereto and unprocessed non-extracted beverage inside in the cap catcher in a hydrogen atmosphere. The capped container is heated and sterilized before bale packing and shipping. According to this example, during the sterilizing and heating process, water or alcohol added to the airtight container may boil. The wine or orange juice in powder or granulate form attached to the inside of the cap may boil up and is cooked for the first time during this process. The fine carbon particles and unprocessed non-extracted beverage and flavoring are absorbed to the inside of the cap, and the final taste and flavor treatment can be performed during the sterilizing and heating process.

EXAMPLE 10

Figure 15:
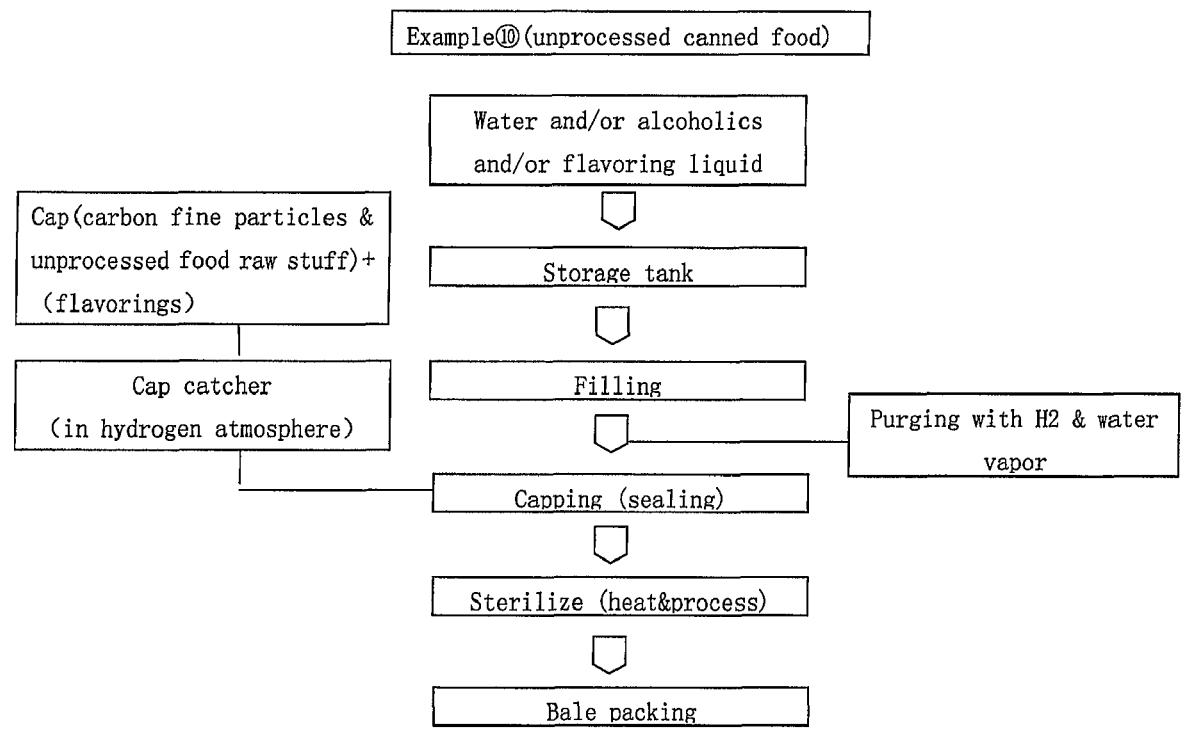
FIG. 15 is a flow diagram for hydrogen-reduced food as unprocessed canned food with the capping method according to the invention.

FIG. 15 is a flow diagram for hydrogen-reduced food as unprocessed canned food with a further capping method for all the processed or unprocessed food. FIG. 15 illustrates hydrogen reduced food as unprocessed canned food with the fine carbon particles attached to the inside of the cap and water or alcohol or flavoring liquids added to an airtight container, i.e. as the water or alcohol or flavoring liquids are added to the airtight container, the unprocessed canned food and fine carbon particles are both absorbed to the inside of the cap. The unprocessed canned food refers to all unprocessed foods except water or beverages such as meat, vegetables, fruits, etc. The water or alcohol or flavoring liquids for making these foods are added to the airtight container. For example, to season crab meat, a flavoring liquid such as soy sauce, etc. and water are added to the airtight container. In addition, the crab meat is boiled or may also be unprocessed. In this example, water or alcohol or flavoring liquid is initially stored in a storage tank and then added to an airtight container by a filling machine. Then, as described above, the container is purged while capping with the cap having fine carbon particles attached thereto and unprocessed canned food inside in the cap catcher in a hydrogen atmosphere. The capped container is heated and sterilized before bale packing and shipping. In addition, according to this example, in the above-mentioned sterilizing and heating process, the water or alcohol or flavoring liquids enclosed in the airtight container may boil up so that the food (crab meat) is cooked for the first time. Moreover, the fine carbon particles and unprocessed canned food and flavoring are absorbed to the inside of the cap and mixed together, and the final taste and flavor treatment can be performed during the sterilizing and heating process. It should be noted that cooking the processed food during the sterilizing and heating process saves the conventional heating operation when cooking.

EXAMPLE 11

Figure 16:
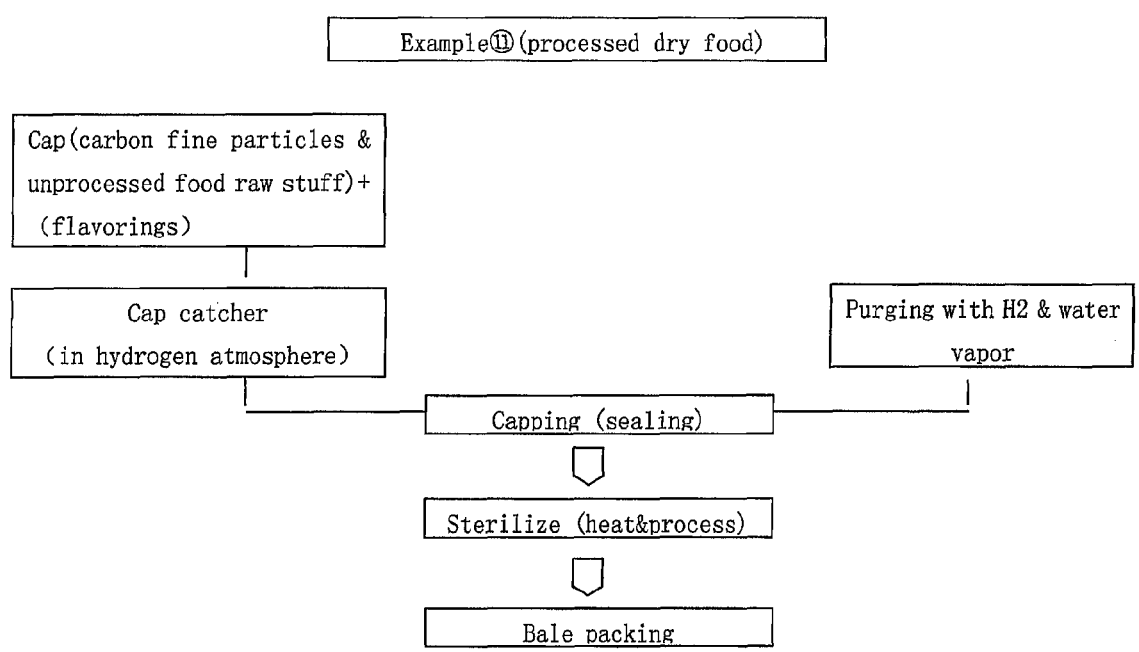
FIG. 16 is a flow diagram for hydrogen-reduced food as processed dry food with the capping method according to the invention.

FIG. 16 is a flow diagram for hydrogen-reduced food as processed dry food with another capping method suitable only for processed dry food. Since the dry food can be eaten without cooking, it is not necessary to add water or alcohol or flavoring liquid to the container. Accordingly, neither the storage tank for flavorings, water or alcohol or flavoring liquids, nor the filling machine for an airtight container is needed. The processed dry food could be, for example, dry beef, dry pineapple, purple layer, etc., which has been cooked and can be eaten. The method of attaching these foods to the inside of the cap includes freeze-drying the food, filling the food into a netty plastic bag attached to the inside of the cap, constructing the inside of the cap so as to be capable of retaining the food, etc. As stated above, this example does not need a storage tank or filling machine, so after the cap with the fine carbon particles attached thereto and processed dry food therein is loaded into the cap catcher, only the upper space of the container need be purged while capping it. After the food is capped in the airtight container, the container is heated and sterilized before bale packing and shipping. In addition, the fine carbon particles and the processed dry food plus the flavoring are absorbed to the inside of the cap so that the final taste and flavor treatment can be performed during the sterilizing and heating process. As mentioned above, the processed dry food capped in the container absorbs hydrogen while the fine carbon particles release a large quantity of hydrogen into the container so that there is sufficient hydrogen.

The above are the main examples of this invention. As there are many kinds of extracted beverages, non-extracted beverages and canned foods, not all of the processes are exactly the same as those described. In addition, in this invention, after filling, the container is purged with hydrogen gas or water vapor or both and sealed with the cap as described. This is the characterizing feature of this invention. So the filling operation of the food, water, alcohol or flavoring liquids may not be exactly the same as those illustrated and described.

The invention claimed is:

1. A capping method for hydrogen-reduced water, comprising the steps of
   (a) loading a plurality of caps each having fine carbon particles attached thereto into a cap catcher in a hydrogen gas, said fine carbon particles being formed of active carbon and having a size between a micrometer and a nanometer;
   (b) adding water to an airtight container via a filling machine;
   (c) purging air from the container by blowing at least one of hydrogen gas and water vapor into the container; and
   (d) capping the container with one of said caps.

2. A capping method for hydrogen-reduced food, comprising the steps of
   (a) loading a plurality of caps each having fine carbon particles attached thereto into a cap catcher in a hydrogen gas, said fine carbon particles being formed of active carbon and having a size between a micrometer and a nanometer;
   (b) adding processed food to an airtight container via a filling machine;
   (c) mixing carbon absorbing hydrogen with food;
   (d) purging air from the container by blowing at least one of hydrogen gas and water vapor into the container; and
   (e) capping the container with one of said caps.

3. A capping method as defined in claim 1, wherein said water is forced into said filling machine by the hydrogen gas.

4. A capping method for hydrogen-reduced food, comprising the steps of
   (a) loading a plurality of caps each having fine carbon particles and flavoring attached thereto into a cap catcher in a hydrogen gas, said fine carbon particles being formed of active carbon and having a size between a micrometer and a nanometer;
   (b) adding processed or unprocessed food to an airtight container via a filling machine;
   (c) mixing carbon absorbing hydrogen with food;
   (d) purging air from the container by blowing at least one of hydrogen gas and water vapor into the container; and
   (e) capping the container with one of said caps.

5. A capping method as defined in claim 4, wherein said food is forced into said filling machine by the hydrogen gas.

6. A capping method for hydrogen-reduced food, comprising the steps of
   (a) loading a plurality of caps each having fine carbon particles and processed or unprocessed food attached thereto into a cap catcher in a hydrogen gas, said fine carbon particles being formed of active carbon and having a size between a micrometer and a nanometer;
   (b) adding at least one of water and flavored alcohol to an airtight container via a filling machine;
   (c) mixing carbon absorbing hydrogen with food;
   (d) purging air from the container by blowing at least one of hydrogen gas and water vapor into the container; and
   (e) capping the container with one of said caps.

7. A capping method as defined in claim 5, wherein said caps further include flavoring absorbed on the inner surface thereof.

8. A capping method for hydrogen-reduced food, comprising the steps of
   (a) loading a plurality of caps each having fine carbon particles and processed dry food attached thereto into a cap catcher in a hydrogen gas, said fine carbon particles being formed of active carbon and having a size between a micrometer and a nanometer;
   (b) adding at least one of water and flavored alcohol to an airtight container via a filling machine;
   (c) mixing carbon absorbing hydrogen with food;

(d) purging air from the container by blowing at least one of hydrogen gas and water vapor into the container; and
(e) capping the container with one of said caps.

9. A cap for closing a container, comprising
(a) a plurality of fine carbon particles attached to an inner surface of said cap, said fine carbon particles absorbing hydrogen and being formed of allotropes of carbon including active carbon and having a size between a micrometer and a nanometer.

10. A cap as defined in claim 9, and further comprising at least one of processed and unprocessed food attached to an inner surface of said cap.

11. A cap as defined in claim 10, and further comprising a flavoring composition attached to an inner surface of said cap, said food and said flavoring composition being in the form of freeze-dried particles.

\* \* \* \* \*